United States Patent [19]

Hayafune et al.

[11] Patent Number: 5,151,463
[45] Date of Patent: Sep. 29, 1992

[54] RESIN COMPOSITIONS INCLUDING CERAMICS EMITTING FAR INFRARED RAYS

[75] Inventors: Koji Hayafune, Tokyo; Shinichi Naemura, Yokohama; Hiroshige Yasumoto, Osaka; Hideo Amemiya, Yokohama, all of Japan

[73] Assignee: Mitsui Toatsu Chemicals, Inc., Tokyo, Japan

[21] Appl. No.: 465,214

[22] PCT Filed: Aug. 30, 1989

[86] PCT No.: PCT/JP89/00884

§ 371 Date: Mar. 12, 1990

§ 102(e) Date: Mar. 12, 1990

[87] PCT Pub. No.: WO90/02152

PCT Pub. Date: Mar. 8, 1990

[30] Foreign Application Priority Data

Aug. 30, 1988 [JP] Japan ................ 63-213615

[51] Int. Cl.$^5$ .............................. C08K 3/22

[52] U.S. Cl. .................... 524/430; 524/431; 524/433; 524/435; 524/436; 524/437; 524/444; 524/450

[58] Field of Search ............ 524/430, 431, 433, 435, 524/436, 437, 444, 450

[56] References Cited

FOREIGN PATENT DOCUMENTS 60-155267 8/1985 Japan .
60-241691 11/1985 Japan .

OTHER PUBLICATIONS

"Polymer Handbook"; Brandrup et al.; John Wiley and Sons, (1975), pp. VIII-5-VIII-6.

Primary Examiner—Paul R. Michl
Assistant Examiner—Edward Cain
Attorney, Agent, or Firm—Burns, Doane, Swecker & Mathis

[57] ABSTRACT

Resin compositions comprising hygroscopic resins of relatively high water absorption rate, including (or coated by, or covered by) ceramics capable of emitting far infrared rays. The resin compositions are useful as materials of devices or receptacles for maintaining freshness of food or water.

7 Claims, 1 Drawing Sheet

RESIN COMPOSITIONS INCLUDING CERAMICS EMITTING FAR INFRARED RAYS

TECHNICAL FIELD

The present invention relates to resin compositions including ceramics emitting far infrared rays.

BACKGROUND ART

It is known that ceramics consisting of some kinds of metallic oxides or their composite materials can emit far infrared rays having a wave-length not less than 3 microns, in particular, of 4–25 microns at the normal temperature.

Until now, far infrared rays emitted by ceramics have been utilized for heating, drying, or disinfecting foods in a short wave length range at high temperature. Recently, however, utilization of far infrared rays in a long wave length area at or below the room temperature has been noted; as a result, various products utilizing these ceramics have been proposed in order to maintain the freshness and sanitation of foods.

Since these ceramics can be easily formed at or near room temperature, powder ceramics are generally kneaded into polyolefin resins etc. to be formed into a film, a sheet, or other moldings.

However, compositions obtained by kneading powder ceramics into resins such as polyethylene or polypropylene are low in transmission factors of far infrared rays having a wave-length of 3–25 microns, in particular 4–14 microns, and therefore, far infrared rays emitted from ceramics were not able to be satisfactorily utilized.

DISCLOSURE OF THE INVENTION

It is an object of the present invention to provide a composite material of ceramics and resins, which enables far infrared rays emitted from ceramics to be efficiently utilized.

The above object can be attained by resin compositions, according to the present invention, wherein said resin compositions include hygroscopic resins (as base resins) of relatively high water absorption rates, for example high nitrile resins.

It is another object of the present invention to provide resin compositions emitting efficiently far infrared rays.

BEST MODE FOR CARRYING OUT THE INVENTION

Figure 1:
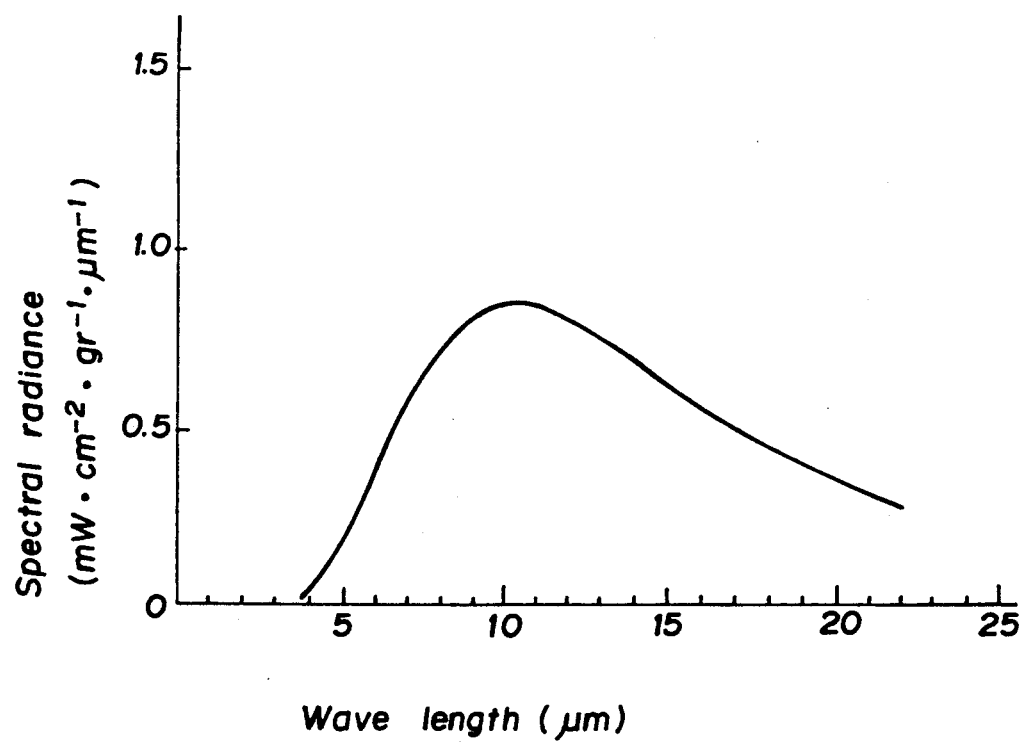
FIG. 1 is a graph showing an example of a spectral radiance/wave-length curve obtained by measuring a sheet made from a resin composition according to the present invention. The resin composition having characteristics shown in FIG. 1 was obtained in the following manner: Ceramics, a principal component of which is aluminum oxide, i.e. powder ceramics SCR3 (produced by SANWA LIFE SERA CO., Ltd. and presented by SANKI BUSSAN CO., Ltd.), were blended or added 20% by weight to one of high nitrile resins, BAREX (a trade mark of a product of MITSUI TOATSU CHEMICALS, INC.), and this mixture was melted at about 210° C. and was mixed and kneaded by means of a twin-screw extruder of 30 mm diameter.

As ceramics emitting 9 far infrared rays which has a wavelength of 3–25 microns at used temperatures, there are oxides of metal such as aluminum, silicon, titanium, magnesium, zirconium or mixtures thereof. Hygroscopic resins used in the present invention are preferably such that they exhibit a water absorption rate not less than 0.1% when measured by ASTM D-570 (24 Hr/1/2 in).

In the most desired embodiment, although high nitrile resins are highly recommended, other resins can also be used, for example, methylmethacrylate, polyphenyl-sulfone, polycarbonate, polyacetal, nylon-6, nylon-66, polyethylene-terephthalate, or vinyl chloride resins.

The high nitrile resins in the present specification and claims mean a copolymer which contains an unsaturated nitrile compound such as acrylonitrile or methacrylonitrile as a principal component thereof, said copolymer containing said unsaturated nitrile compound in the ratio of 50% by weight or more, preferably more than 55% by weight.

A copolymer of the unsaturated nitrile compound and at least one kind of comonomers such as styrene, butadiene, isoprene, methylacrylate, ethylacrylate, methylmethacrylate, ethylmethacrylate may be used.

As the high nitrile resins, a mixture may be used, for example, a mixture of a copolymer including the unsaturated nitrile compound as a principal part thereof with a rubber-like polymer such as butadiene-acrylonitrile copolymer, butadiene-styrene copolymer, isoprene-ethylene copolymer, polybutadiene, and polyisoprene such that the unsaturated nitrile compound is contained in said mixture in the ratio of 50% weight or more, or a copolymer obtained by copolymerizing a mixture of the unsaturated nitrile compound with said comonomer in the presence of the rubber-like polymer. These resins are highly recommended because of the high impact-resistant property thereof.

These high nitrile resin compositions may include, as additives, antioxidant, an ultraviolet rays absorbing agent, an antistatic agent, a lubricant, an inorganic filler, a colored pigment, or a small amount of other resins.

These resin compositions including such ceramics may also be obtained by mixing ceramics with a high nitrile resin which was melted by heat rolls, or by kneading through an extruder.

A mixture ratio of ceramics to resins may be determined within a range of 5%–80% by weight, depending on uses or use conditions. Generally, 10%–40% by weight may be adopted but not be limited thereto, and the ratio may be suitably determined depending upon kinds of used resins, the composition of ceramics and a wave length of emitted far infrared rays.

EXAMPLE 1

As described above, ceramics, a principal component of which was aluminum oxide, i.e. powder ceramics SCR3 (produced by SANWA LIFE SERA Co., Ltd. and presented by SANKI BUSSAN CO., Ltd.), were blended or added 20% by weight to one of high nitrile resins, BAREX (a trade mark of a product of MITSUI TOATSU CHEMICALS, INC.).

This mixture was melted at about 210° C. and was mixed and kneaded by means of a twin-screw extruder of 30 mm diameter to thereby form the resin composition having characteristics as shown in FIG. 1.

Using this resin composition, a sheet of about 2 mm thickness was made. Using this sheet, a foods preservation test was performed. KIBINAGO (a kind of small fish) which was just obtained from the sea, from which the intestines were removed, was cooked, put on the sheet 5, wrapped with a paper-towel, and preserved in a refrigerator, inside temperature of which was 4° C.

When inspected after 24 hours, no change was shown in color, smell or taste.

COMPARISON 1

A sheet was made from only the same resin of Example 1 without adding ceramic powders thereto. Using this sheet, the same test was performed. As a result, it was recognized that the KIBINAGO discolored, lost its freshness, and its taste was spoiled.

EXAMPLE 2

The same test as in Example 2 was performed except that Nylon-66 resin was used instead of the high nitrile resin.

After being preserved for 20 hours, the fish did not show any change in color, smell, or taste.

COMPARISON 2

A sheet was made only from the same resin i.e. Nylon-66 as in Example 2 without adding ceramics powders. Using this sheet, the same test as in Example 2 was performed. As a result, after 5 hours, it was recognized that the fish discolored and its freshness was lost.

EXAMPLE 3

The same test as in Example 1 was performed except that slices of a bonito were used instead of KIBINAGO.

After 7 hours, the slices did not change in color. We had 10 examiners eat and evaluate slices cut 7 hours before and immediately cut slices through sense comparison test. However, nobody was able to distinguish between the two.

COMPARISON 3

The same comparison as in Example 3 test was made using the sheet without ceramic powders being added thereto.

After 3 hours, the slices of the bonito turned black in color.

The sense test of the slices by all 10 examiners indicated that the taste of the immediately cut slices was superior to the slices cut 3 hours before.

EXAMPLE 4

A sheet of 1 mm thickness was made from the resin composition used in Example 1. Using this sheet, an ice-freezing receptacle having 10 cells of about 2 mm×2 cm×2 cm was formed.

Using this receptacle, transparent ice blocks with less air bubbles were made in a refrigerator.

COMPARISON 4

An ice-freezing receptacle was made of a sheet made only from the high nitrile resin without adding ceramics powders Using this receptacle, the same test as in Example 4 was performed, resulting in slightly opaque or cloudy blocks of frozen water.

When the resin compositions according to the present invention are used, the functions of far infrared rays emitted by the ceramics can be sufficiently utilized without injuring the property of various resins, and thus various functions of far infrared rays may be suitably applied.

In particular, a high nitrile resin is also superior in gas barrier property and thus it may be used for a food package, for example, a gas charged package in combination with freshness maintaining effect of far infrared rays or a deoxidized package in combination with oxygen scavengers.

In addition, high nitrile resins are suitable since a printing, a painting, and a hot-stamping, etc. can be easily applied thereto.

What is claimed is:

1. A resin composition comprising a hygroscopic resin and a ceramic effective for emitting far infrared rays, said hygroscopic resin having a water absorption rate not less than 0.1% when measured by ASTM D-570, wherein said hygroscopic resin is a high nitrile resin.

2. A resin composition according to claim 1, wherein said high nitrile resin is a copolymer including an unsaturated nitrile compound in an amount of 50% or more by weight.

3. A resin composition according to claim 1, wherein said high nitrile resin is a copolymer of an unsaturated nitrile compound with at least one monomer selected from a group consisting of styrene, butadiene, isoprene, methylacrylate, ethylacrylate, methylmethacrylate and ethylmethacrylate.

4. A resin composition according to claim 1, wherein said high nitrile resin is a mixture of (i) at least one rubber-like polymer selected from a group consisting of butadiene-acrylonitrile copolymer, butadiene-styrene copolymer, isoprene-styrene copolymer, polybutadiene and polyisoprene; and (ii) a copolymer, a principal component thereof being an unsaturated nitrile compound.

5. A resin composition according to claim 1, wherein said high nitrile resin is a copolymer obtained by copolymerizing, in the presence of at least one rubber-like polymer selected from the group consisting of butadiene-acrylonitrile copolymers, butadiene-styrene copolymers, isoprene-styrene copolymers, polybutadienes, and polyisoprenes;
   (A) at least one monomer selected from a group consisting of styrene, butadiene, isoprene, methylacrylate, ethylacrylate, methylmethacrylate, and ethylmethacrylate; and
   (B) an unsaturated nitrile compound.

6. A resin composition according to claim 1, wherein said ceramic emits rays having wavelengths of 3-25 microns.

7. A resin composition according to claim 6, wherein said ceramic emits rays having a wavelength of 4-14 microns.

* * * * *